UNITED STATES PATENT OFFICE.

FREDERICK WILLIAM MARTINO AND FREDERIC STUBBS, OF SHEFFIELD, ENGLAND.

PROCESS OF TREATING ORES CONTAINING PRECIOUS METALS.

SPECIFICATION forming part of Letters Patent No. 635,793, dated October 31, 1899.

Original application filed December 23, 1898, Serial No. 700,107. Divided and this application filed July 25, 1899. Serial No. 725,083. (No specimens.)

*To all whom it may concern:*

Be it known that we, FREDERICK WILLIAM MARTINO and FREDERIC STUBBS, subjects of the Queen of England, residing at Sheffield, county of York, England, have invented certain new and useful Improvements in or Relating to the Treatment of Ores Containing the Precious Metals, (for which we have made application for Letters Patent in Great Britain, No. 25,979, dated December 8, 1898; in Germany, filed December 23, 1898; in New South Wales, No. 9,109, filed March 22, 1899; in Victoria, No. 15,996, filed March 20, 1899; in Queeensland, No. 4,848, filed March 23, 1899; in South Australia, No. 5,848, filed March 20, 1899; in Western Australia, No. 2,428, filed March 17, 1899; in New Zealand, No. 11,486, filed March 28, 1899; in Transvaal, No. 1,834, filed March 11, 1899; in Canada, No. 84,874, filed February 28, 1899, and in Mexico, filed March 28, 1899,) of which the following is a specification, it being a division of our application, Serial No. 700,107, filed December 23, 1898.

This invention relates to the treatment of ores or tailings containing the precious metals, its primary object being to set free the precious metal prior to its extraction, when it is combined with or intimately inclosed in the metalloids or the baser metals.

The essential feature of this invention is the employment of calcium carbid in the treatment of the ores.

When the precious metals are combined with or intimately inclosed in the metalloids—sulfur, selenium, tellurium, phosphorus, silicon, &c., or the baser metals, such as arsenic and antimony—the ore is finely divided and thoroughly mixed in a dry state with calcium carbid. The mixture is then moistened, the result being that acetylene is generated, accompanied by considerable heat. By the action of the acetylene hydrids of the metalloids or baser metals are formed, leaving the precious metal in the "free" state. The free precious metal may be treated in any convenient way. Preferably the coarser metal is separated by washing and the finer particles dissolved in a cyanid solution, which is then subjected to the action of acetylene or calcium carbid according to the process described in our United States patent application, Serial No. 700,107, filed December 23, 1898. This treatment of the finely-divided ore with calcium carbid is also applicable to silicious or quartzy ores or tailings, where minute particles of the precious metal are inclosed in a casing of silica. The casing is opened up by the action of the carbid, leaving the gold exposed, so that it may be acted upon by any desired solvent.

The intimate mixture of ore and calcium carbid, either before or after moistening, may be heated in any convenient form of furnace, and such heating is found to accelerate the process. The following are the chemical reactions which probably take place in the process according to this invention, telluride of gold of the probable formula $Au_2Te$ being taken as an example: When dry calcium carbid is mixed with the telluride of gold and the mixture then moistened with water, the telluride of gold is decomposed into gold and tellurium hydrid, the reaction being expressed by the following equation:

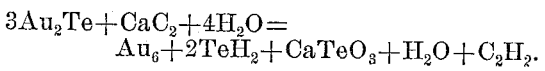

$$3Au_2Te + CaC_2 + 4H_2O = Au_6 + 2TeH_2 + CaTeO_3 + H_2O + C_2H_2.$$

The free gold can, as stated above, be extracted in any convenient manner.

We claim—

The treatment of ores or tailings containing the precious metals by finely dividing the ore mixing it with calcium carbid and moistening the mixture with water substantially as described.

In testimony whereof we have hereto set our hands in the presence of the two subscribing witnesses.

FREDERICK WILLIAM MARTINO.
FREDERIC STUBBS.

Witnesses:
JOSEPH BRIGHT,
THOMAS HARVEY.